US006914210B2

(12) United States Patent
Grossklaus, Jr. et al.

(10) Patent No.: US 6,914,210 B2
(45) Date of Patent: Jul. 5, 2005

(54) METHOD OF REPAIRING A STATIONARY SHROUD OF A GAS TURBINE ENGINE USING PLASMA TRANSFERRED ARC WELDING

(75) Inventors: Warren Davis Grossklaus, Jr., West Chester, OH (US); Matthew Nicklus Miller, Maineville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/286,190

(22) Filed: Oct. 30, 2002

(65) Prior Publication Data

US 2004/0084423 A1 May 6, 2004

(51) Int. Cl.$^7$ ............................................... B23K 10/00
(52) U.S. Cl. ............................ 219/121.45; 219/121.59; 219/121.47; 219/76.16; 219/121.46; 29/889.1
(58) Field of Search ........................ 219/121.45, 121.46, 219/121.47, 121.59, 121.48, 75, 137 WM, 76.15, 76.16; 29/889.1, 889.7, 402.11, 402.18

(56) References Cited

U.S. PATENT DOCUMENTS

| 4,822,248 A | | 4/1989 | Wertz et al. |
| 5,584,663 A | * | 12/1996 | Schell et al. ................. 420/445 |
| 5,622,638 A | | 4/1997 | Schell et al. |
| 5,756,966 A | * | 5/1998 | Offer ...................... 219/124.03 |
| 5,938,944 A | | 8/1999 | Baughman et al. |
| 6,020,571 A | | 2/2000 | Grossklaus, Jr. et al. |
| 6,084,196 A | | 7/2000 | Flowers et al. |
| 6,233,822 B1 | | 5/2001 | Grossklaus, Jr. et al. |

FOREIGN PATENT DOCUMENTS

| EP | 0 558 053 A | 1/1993 |
| EP | 1 013 788 A | 6/2000 |
| EP | 1 312 437 A | 5/2003 |
| JP | 11 336502 A | 7/1999 |

* cited by examiner

*Primary Examiner*—Mark Paschall
(74) *Attorney, Agent, or Firm*—McNees Wallace & Nurick LLC

(57) ABSTRACT

A stationary shroud of a gas turbine engine made of a base metal is repaired by removing any damaged material from a flow-path region of the stationary shroud to leave an initially exposed base-metal flow-path surface; and applying a base-metal restoration overlying the initially exposed flow-path surface. The base-metal restoration is applied by furnishing a source of a structural material that is compatible with the base metal, and depositing the source of the structural material overlying the initially exposed base-metal flow-path surface of the stationary shroud by plasma transferred arc welding to form a repaired base-metal flow-path surface. An environmentally resistant rub coating may be applied overlying the base-metal restoration.

19 Claims, 4 Drawing Sheets

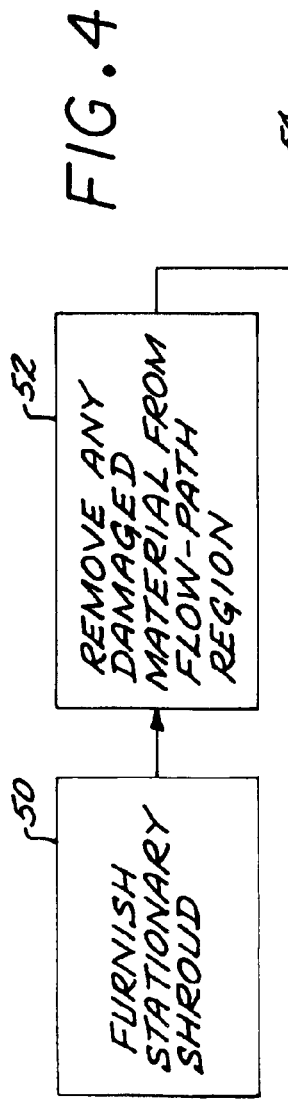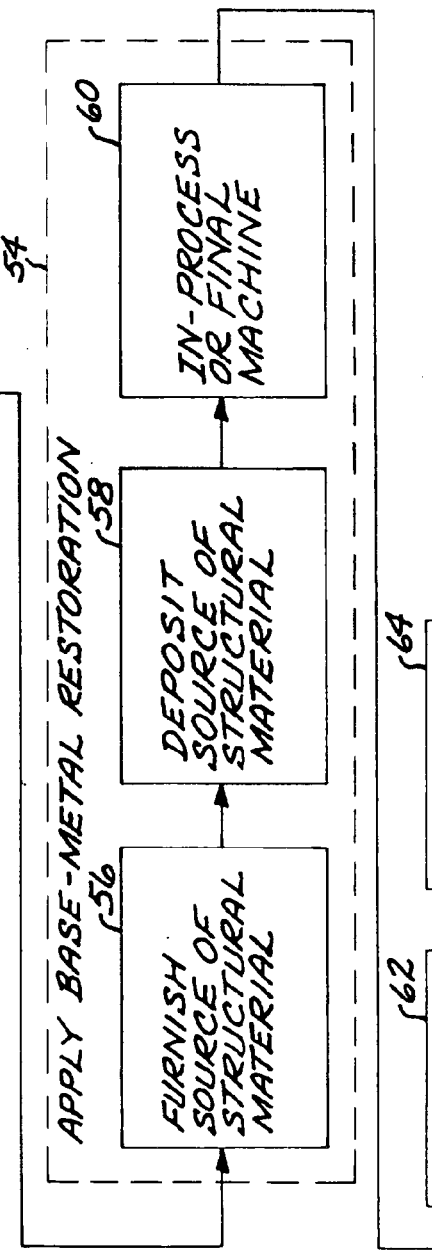

METHOD OF REPAIRING A STATIONARY SHROUD OF A GAS TURBINE ENGINE USING PLASMA TRANSFERRED ARC WELDING

This invention relates to aircraft gas turbine engines and, more particularly, to the repair of a stationary shroud that has previously been in service.

BACKGROUND OF THE INVENTION

In an aircraft gas turbine (et) engine, air is drawn into the front of the engine, compressed by a shaft-mounted compressor, and mixed with fuel. The mixture is burned, and the hot combustion gases are passed through a gas turbine mounted on the same shaft. The flow of combustion gas turns the gas turbine by impingement against an airfoil section of the turbine blades and vanes, which turns the shaft and provides power to the compressor. The hot exhaust gases flow from the back of the engine, driving it and the aircraft forward.

In the gas turbine, an annular, circumferentially extending stationary shroud surrounds the tips of the rotor blades. The stationary shroud confines the combustion gases to the gas flow path so that the combustion gas is utilized with maximum efficiency to turn the gas turbine. The clearance between the turbine blade tips and the stationary shroud is minimized to prevent the leakage of combustion gases around the tips of the turbine blades. The stationary shroud provides a rubbing surface for the tips of the turbine blades. The design intent is for the turbine blade tips to rub into the stationary shroud, with the contact acting in the manner of a seal. The clearance between the blade tips and the stationary shroud, and thence the amount of combustion gas that can bypass the turbine blades, is minimized, thereby ensuring maximum efficiency of the engine. The stationary shroud must be manufactured to and maintained at highly exacting tolerances in order to achieve this efficiency during extended service.

The gas path surface of the stationary shroud is exposed to abrasion by the rotating turbine blade tips and also to erosion, oxidation, and corrosion by the hot combustion gases. The base metal of the stationary shroud is typically not highly resistant to the environmental attack and abrasion, and therefore an environmentally resistant rub coating is applied on the gas path surface of the stationary shroud. Over a period of time as the engine operates, the surface of the environmentally resistant rub coating is worn away, and some of the base metal of the stationary shroud may also be damaged and/or removed. The result is that the dimensions of the stationary shroud are reduced below the required tolerances for efficient operation of the gas turbine engine. Alternatively stated, the annular radius of the inwardly facing surface of the stationary shroud gradually increases, so that an increasing amount of combustion gas leaks around the tips of the turbine blades and the operating efficiency is reduced. At some point, the stationary shroud is no longer operating acceptably and the operation of the gas turbine degrades below acceptable levels.

Because of the high cost of the stationary shroud materials, rather than dispose of the stationary shrouds, it is desirable to repair the stationary shrouds by restoring the stationary shrouds to their original dimensions in accordance with preselected tolerances as determined by the engine's size as well as to restore the corrosion resistant properties to the flow-path surfaces. In the past, this restoration has been accomplished by low pressure plasma spray (LPPS), thermally densified coatings (TDC), the high-velocity oxyfuel (HVOF) process, or activated diffusion healing (ADH). The first three approaches restore the stationary-shroud dimensions using the rub-resistant coating material but do not restore the structural strength of the underlying shroud base metal. The fourth approach repairs holes and cracks in the shroud base metal, prior to re-application of the rub-resistant coating material.

In the work leading to the present invention, the inventors have observed that these approaches achieve the desired restoration of the dimensions of the stationary shroud, but do not restore its mechanical performance. The stationary shroud no longer has its necessary mechanical properties, so that there is a risk of mechanical failure of the stationary shroud. There is needed an approach by which the mechanical properties as well as the dimensions of the coated stationary shroud are restored. The present invention fulfills this need, and further provides related advantages.

BRIEF SUMMARY OF THE INVENTION

The present invention provides a technique for restoring the mechanical properties as well as the dimensions, environmental resistance, and rub resistance of the flow-path surface of a stationary shroud of a gas turbine engine, and a stationary shroud repaired by this approach. The present method is typically utilized after the gas turbine engine has been in service and the stationary shroud has been subjected to extended operation in combustion gas, high temperatures, and rubbing from the movement of the turbine blades. The present approach may be utilized with conventional procedures known for use in other applications.

A method for repairing a stationary shroud of a gas turbine engine comprises the steps of furnishing the stationary shroud that has previously been in service, the stationary shroud being made of a base metal, removing any damaged material from a flow-path region of the stationary shroud to leave an initially exposed base-metal flow-path surface, and applying a base-metal restoration overlying the initially exposed flow-path surface. The step of applying includes the steps of furnishing a source of a structural material that is compatible with the base metal, and depositing the source overlying the initially exposed base-metal flow-path surface of the stationary shroud by plasma transferred arc (PTA) welding to form a repaired base-metal flow-path surface. The base-metal restoration is typically in-process machined to its desired dimensions, shape, and surface finish.

The source of the structural material may have substantially the same composition as the base metal, or a different composition. The source of the structural material may be a powder. A plasma transferred arc welder beam may be directed toward the initially exposed flow-path surface, and simultaneously the powder of the structural material may be injected into the plasma transferred arc welder beam so that the powder is fused and deposited. The source of the structural material may instead be a wire that is fed into the plasma transferred arc welder beam and fused onto the surface that is being restored.

The stationary shroud may be any stationary shroud, but it is preferably a high pressure turbine stationary shroud. The stationary shroud may be made of any operable material, but it is preferably made of a nickel-base alloy or a cobalt-base alloy.

Preferably, an environmentally resistant rub coating is thereafter applied overlying the base-metal restoration. The an environmentally resistant rub coating defines a rub-coating surface, and the rub-coating surface is typically shaped, as by machining, to the required shape and dimensions. While this rub-coating material may be any corrosion resistant, oxidation resistant and rub tolerant powder, MCrAlY compositions have been found to be most suitable.

The present invention is an advancement of current technology for repairing and restoring shrouds for engine service. Unlike stationary shrouds repaired by the TDC process, stationary shrouds repaired in accordance with the present invention are not temperature-limited because of additions of melting point depressants such as boron or silicon. The present invention is also an advance over the (LPPS) process, since no partial vacuum is required, making the process faster, cheaper, more effective and easier to perform. Other advantages include less process variation and no preheat to overshoot or undershoot. Very importantly, there is much less part distortion, so that the ability to restore the shroud segments to the original drawing tolerances can be done more easily and with less machining. A less expensive powder material is used in the present approach, as compared with HVOF. The present approach provides achieves results superior to ADH, because the stationary shroud is restored to its original dimensions using a structural material, rather than the rub-resistant coating. The rub-resistant coating is preferably applied over the dimensionally restored base metal of the stationary shroud.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 4 is a block flow diagram of an approach for practicing the present approach;

FIG. 5 is a schematic sectional view of the stationary shroud showing the layers of the restoration, taken generally on line 5—5 of FIG. 2;

DETAILED DESCRIPTION OF THE INVENTION

Figure 1:
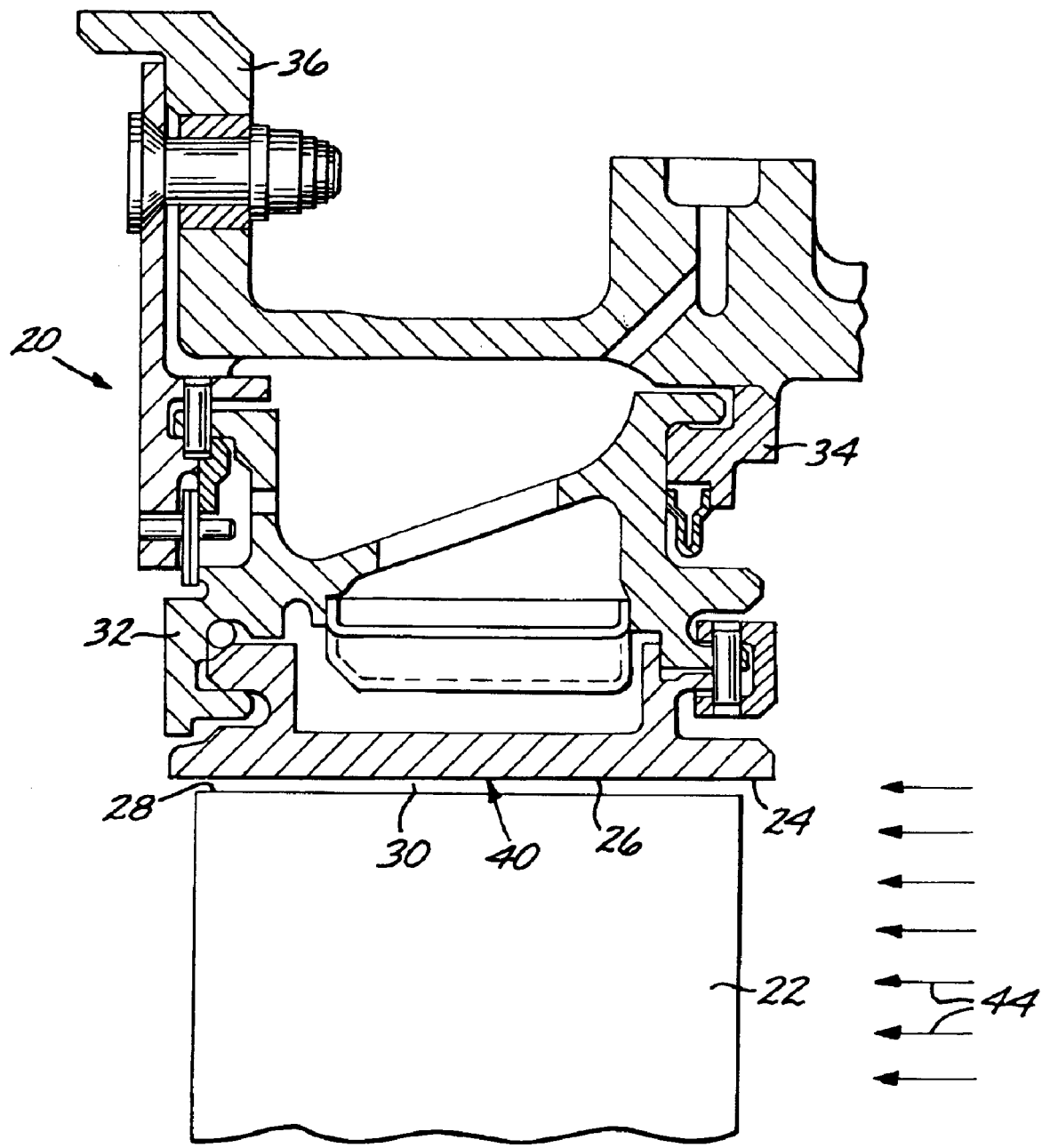
FIG. 1 is a cross-sectional view of a stationary shroud assembly, showing a shroud segment and the shroud flow-path surface adjacent to the tip of a turbine blade, the shroud support, the shroud hanger support and the support case.

FIG. 1 is a cross-sectional view generally depicting a stationary shroud assembly 20 in relation to a turbine blade 22. The stationary shroud assembly includes a stationary shroud 24 having a flow-path surface 26 in a facing relation to a turbine blade tip 28 of the turbine blade 22. (The term "stationary shroud" as used herein refers to structure which does not rotate as the turbine blade 22 turns with its supporting turbine disk (not shown) and turbine shaft (not shown). The stationary shroud 24 is to be distinguished from the rotating shroud that is found at the tip of some other types of blades and is a part of the blade, and which does rotate as the blade turns.) A small gap 30 separates the flow-path surface 26 from the turbine blade tip 28. The smaller is the gap 30, the less hot combustion gas 44 that can leak through the gap 30 and not participate in driving the turbine blade 22. Also depicted are a stationary shroud support 32 from which the stationary shroud 22 is supported, a stationary shroud hanger support 34 from which the stationary shroud support 32 is supported, and a support case 36 from which the stationary shroud hanger support 34 is supported.

Figure 2:
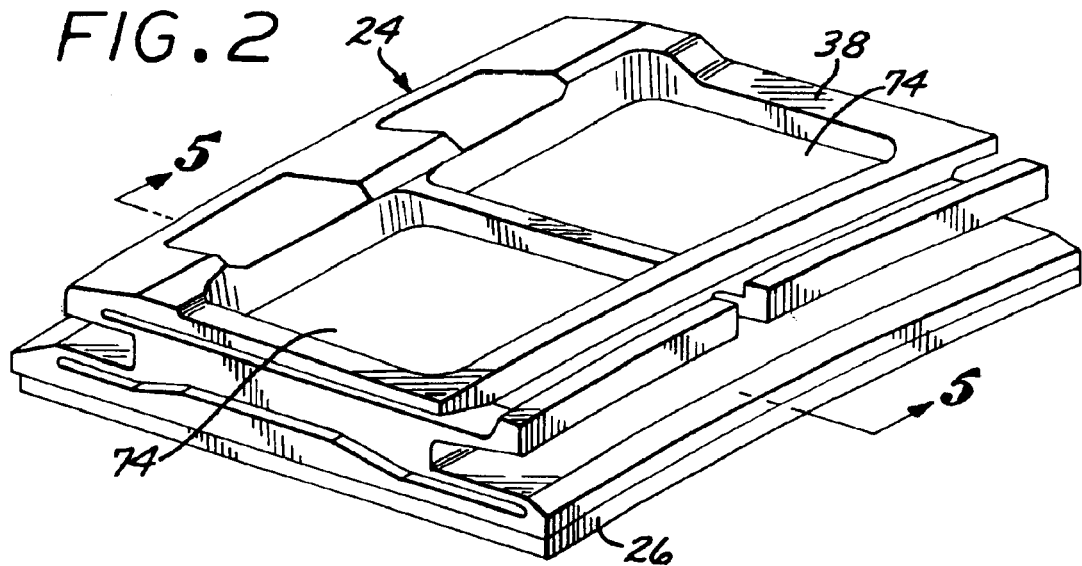
FIG. 2 is a perspective view of a stationary shroud segment.
Figure 3:
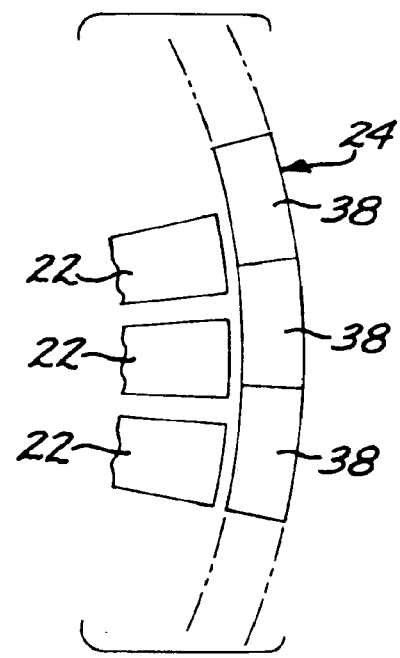
FIG. 3 is a partial perspective view of a stationary shroud assembly, comprised of a series of shroud segments assembled to form a portion of a cylinder around turbine blades.

For reasons of manufacturing, assembly, and thermal expansion compatibility, the stationary shroud 24 is typically formed of a circumferentially extending series of individual stationary shroud segments 38. FIG. 2 illustrates one of the stationary shroud segments 38, and FIG. 3 depicts the manner in which the individual stationary shroud segments 38 are assembled together in a circumferentially abutting fashion to form the annular, generally cylindrical stationary shroud 24. The structure of the stationary shrouds is described more fully in U.S. Pat. No. 6,233,822, whose disclosure is incorporated by reference.

When the gas turbine engine is operated, the turbine blades 22 rotate. As they rotate and are heated to elevated temperature, the turbine blades 22 elongate so that the gap 30 is reduced to zero and the turbine blade tips 28 contact and cut into the flow-path surface 26 and wear away the material of the stationary shroud 24 at the flow-path surface 26. Over time, the gap 30 becomes larger as material is abraded from both the turbine blade tips 28 and the stationary shroud 24, and also lost from the turbine blade tips 28 and the stationary shroud 24 by erosion, oxidation, and corrosion in the hot combustion gases. As the gap 30 becomes larger, the efficiency of the gas turbine decreases. At some point, the gas turbine engine is removed from service and repaired.

FIG. 4 depicts a preferred approach for repairing the stationary shroud 24. The stationary shroud 24 that has previously been in service is furnished, step 50. In the case of most interest, the stationary shroud 24 is a high pressure turbine stationary shroud. The stationary shroud is made of a base metal 42, see FIG. 5. The base metal 42 of the stationary shroud 24 is preferably either a nickel-base alloy or a cobalt-base alloy. Examples of such base-metal alloys include L605, having a nominal composition by weight of about 20 percent chromium, about 10 percent nickel, about 15 percent tungsten, about 3 percent iron, about 1 percent silicon, about 1.5 percent manganese, about 0.1 percent carbon, and the balance cobalt and incidental impurities; Rene™ N5, having a nominal composition by weight of 7.5 percent cobalt, 7 percent chromium, 6.2 percent aluminum, 6.5 percent tantalum, 5 percent tungsten, 3 percent rhenium, 1.5 percent molybdenum, 0.15 percent hafnium, 0.05 percent carbon, 0.004 percent boron and the balance nickel and incidental impurities; IN-738 having a nominal composition by weight of 8.5 percent cobalt, 16 percent chromium, 3.4 percent aluminum, 3.8 percent titanium, 1.75 percent tantalum, 2.6 percent tungsten, 1.75 percent tantalum, 0.012 percent boron 0.0.12 percent zirconium, 0.05 percent niobium and the balance nickel and incidental impurities; Rene$^R$ 77, having a nominal composition in weight percent of about 14.6 chromium, about 15.0 percent cobalt, about 4.2 percent molybdenum, about 4.3 percent aluminum, about 3.3 percent titanium, about 0.07 percent carbon, about 0.016 percent boron, about 0.04 percent zirconium, balance nickel and minor elements; and MarM509, having a nominal composition by weight of about 10 percent nickel, about 0.6 percent carbon, about 0.1 percent manganese, about 0.4 percent silicon, about 22.5 percent chromium, about 1.5 percent iron, about 0.01 percent boron, about 0.5 percent zirconium, about 7 percent tungsten, about 3.5 percent tantalum, and the balance cobalt and incidental impurities. This listing is exemplary and not limiting, and the present approach may be used with any operable material.

Any damaged material is removed from a flow-path region 40 of the stationary shroud 24, step 52, to leave an initially exposed base-metal flow-path surface 70, see FIG. 5. The flow-path region 40 generally corresponds with the location of the flow-path surface 26 of FIG. 1, but is not exactly coincident because of the presence of damaged material and the loss of base metal 42 during service. The damaged material may include remnants of the prior rub coating, damaged base metal, and oxidation, corrosion, and erosion products, as well as soot. The damaged material may be removed by any operable approach. In one approach, the flow-path region 40 is first degreased by any operable approach. The flow-path region 40 is then ground or grit-blasted to remove any tightly adhering oxides. Next the flow-path region 40 is acid stripped to remove the aluminides, followed by a fluoride-ion cleaning (FIC).

A typical result of this removal of damaged material, and the prior removal of base metal 42 by oxidation and abrasion during service, is that the thickness to of the base metal 42 in a backside-pocket (thinnest) portion 74 of the flow-path region 40 of the stationary shroud 24 is too thin, and below the thickness required by the specifications. This sub-specification thickness is undesirable, because if a rub coating were applied directly to the exposed surface at this point, the stationary shroud 24 would have insufficient mechanical properties and insufficient resistance to bowing (chording) when returned to service.

A base-metal restoration 72 is applied overlying and in contact with the initially exposed flow-path surface 70 in the flow-path region 40, step 54. The base-metal restoration 72 has a thickness $t_A$ that, when added to $t_0$, increases the thickness of the backside-pocket portion 74 of the flow-path region 40 to a restored thickness $t_R$, which is within the tolerance range of the thickness specification for the backside-pocket 74.

The step of applying 54 includes the steps of furnishing a source of a structural material that is compatible with the base metal 42, step 56, and depositing the structural material overlying the initially exposed base-metal flow-path surface 70 of the stationary shroud 24 by plasma transferred arc (PTA) welding to form a repaired flow-path surface 76, step 58. Plasma transferred arc welding is a known process for other applications.

The structural material used in the restoration step 54 to apply the base-metal restoration 72 may have substantially the same composition as the base metal 42. The use of substantially the same composition for the restoration as the base-metal composition is preferred, so that the base metal 42 of the stationary shroud 24 and the base-metal restoration 72 are fully compatible both chemically, in respect to properties such as the formation of new phases through interdiffusion, and physically, in respect to properties such as the bonding of the base metal 42 and the base-metal restoration 72, avoiding mismatch of the coefficients of thermal expansion, and melting points. The structural material used in the restoration step 54 to apply the base-metal restoration 72 may instead have a different composition than the base metal 42 to achieve particular properties that may not be achievable when the base-metal restoration 72 is the same composition as the base metal 42.

Figure 6:
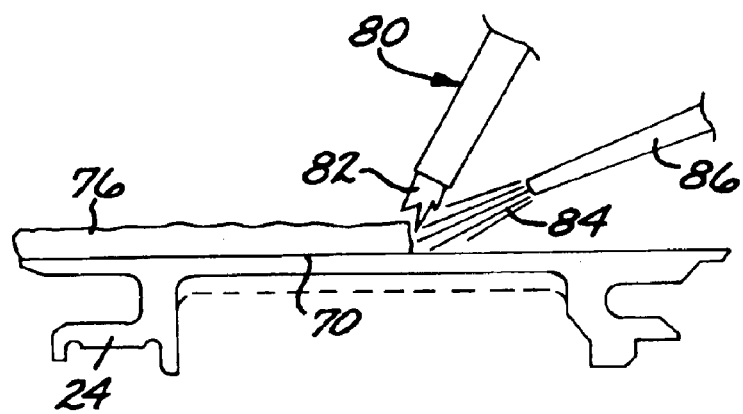
FIG. 6 is a schematic view of the use of injected powder in plasma transferred arc welding.
Figure 7:
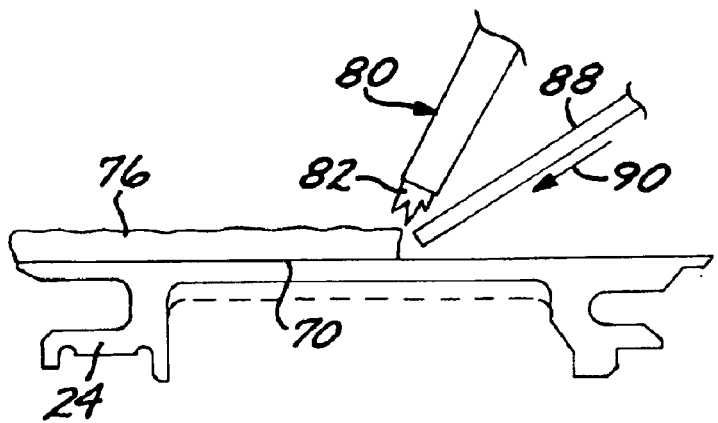
FIG. 7 is a schematic view of the use of a wire feed in plasma transferred arc welding.

Two approaches are of particular interest for depositing the structural material by plasma transferred arc welding, step 58, as depicted in FIGS. 6–7. In the approach shown in FIG. 6, a plasma transferred arc welder beam 82 is directed from the plasma transferred arc welder 80 toward the initially exposed flow-path surface 70. Simultaneously, a powder flow 84 of the restoration powder is injected from a powder injector 86 into the plasma transferred arc welder beam 82 and upon the initially exposed flow-path surface 70 so that the powder is fused and deposited onto the initially exposed flow-path surface 70. The power level of the plasma transferred arc welder 80 is selected so that the injected powder is melted and the topmost portion of the base metal 42 is melted, but that the underlying portion of the base metal 42 is not melted. The plasma transferred arc welder 80 and the powder injector 86 move together laterally across the initially exposed flow-path surface 70, so that the injected powder is progressively melted when exposed to the plasma transferred arc welder beam 82, and then progressively allowed to solidify as the plasma transferred arc welder 80 moves onwardly and no longer heats a particular area.

In the approach of FIG. 7, the plasma transferred arc welder beam 82 is directed from the plasma transferred arc welder 80 toward the initially exposed flow-path surface 70. Simultaneously, a wire 88 of the structural material is fed into the heated zone with a wire feed, schematically indicated by a wire feed arrow 90, so that the metal of the wire 88 is fused and deposited onto the initially exposed flow-path surface 70. The wire 88 may be supplied in discrete lengths or as a continuous coil. The power level of the plasma transferred arc welder 80 is selected so that the wire 88 is melted and the topmost portion of the base metal 42 is melted, but that the underlying portion of the base metal 42 is not melted. The plasma transferred arc welder 80 and the wire feed 90 move together laterally across the initially exposed flow-path surface 70, so that the injected powder is progressively melted when exposed to the plasma transferred arc welder beam 82, and then progressively allowed to solidify as the plasma transferred arc welder 80 moves onwardly and no longer heats a particular area.

The two approaches of FIGS. 6 and 7 may be combined as well, with some of the source of the structural material being introduced as a powder as in FIG. 6, and some of the source of the structural material being introduced as a wire, as in FIG. 7.

The present approach offers distinct advantages over other techniques. The flow-path region 40 to which the base-metal restoration 72 is applied is typically rather thin. To avoid distorting the thin base metal 42, it is desirable that the heat input during the restoration 54 be no greater than necessary. The plasma transferred arc welder 80 has a much lower heat input than other techniques such as a TIG welder, so that it melts the restoration material but does not introduce more heat than necessary. However, because the restoration material and the uppermost portion of the initially exposed flow-path surface 70 are melted during the heating, there is a strong metallurgical bond between the restoration 72 and the underlying base metal 42, unlike some other techniques such as some thermal spray processes. The present approach also produces a relatively large grain size in the restoration 72, when compared to LPPS and HVOF processes, which is desirable for creep and rupture properties.

In any case, the result is the solidified base-metal restoration 72, with its repaired flow-path surface 76, deposited overlying and upon the initially exposed flow-path surface 70. As noted above, the amount of structural material restoration 72 applied in step 54 is such that, after the deposition step 58, the thickness $t_R$ (=$t_0$+$t_A$) is desirably within a pre-defined specification range required for the stationary shroud 24 to be returned to service. However, it is difficult to achieve that result precisely and with a highly uniform surface, and the usual approach is to deposit the structural material to be slightly thicker than desired.

The deposited base-metal restoration is then in-process machined, numeral 60, so that the total restored thickness $t_R$ of the base metal is the desired value and the shape of the repaired base-metal flow-path surface 76 is correct. The powder deposition process 58 is not sufficiently precise to achieve exactly the correct thickness and shape, and the in-process machining step 60 is used.

Optionally but strongly preferred, an environmentally resistant rub coating 78 is applied overlying and contacting the base-metal restoration 72, step 62. The rub coating 78 is preferably a material, typically in the form of a powder and having enhanced environmental resistance which is rub compliant. Examples of such rub coating materials include an MCrAlY(X) where M is an element selected from the group consisting of cobalt and nickel and combinations thereof and (X) is an element selected from the group of solid solution strengtheners and gamma prime formers consisting of titanium, tantalum, rhenium, molybdenum, and tungsten, and grain boundary strengtheners consisting of boron, carbon, hafnium, and zirconium, and combinations thereof; and BC-52 alloy, having a nominal composition, in weight percent, of about 18 percent chromium, about 6.5 percent aluminum, about 10 percent cobalt, about 6 percent tantalum, about 2 percent rhenium, about 0.5 percent hafnium, about 0.3 percent yttrium, about 1 percent silicon, about 0.015 percent zirconium, about 0.015 percent boron, about 0.06 percent carbon, the balance nickel and incidental impurities. The rub coating is applied by any operable approach, but preferably by the HVOF (high-velocity oxyfuel) process. The rub coating 78 is preferably in the range of about 0.005–0.150 inches in thickness, most preferably in the range of from 0.005–0.050 inches in thickness. The HVOF process, which utilizes a high velocity gas as a protective shield to prevent oxide formation, is a relatively low temperature thermal spray that allow for application of a high density oxide-free coating in a wide variety of thicknesses, is known in the art. The HVOF process typically uses any one of a variety of fuel gases, such as oxygen, oxypropylene, oxygen/hydrogen mixtures or kerosene. Gas flow of the fuel can be varied from 2000–5000 ft/sec. Of course, the temperature of the spray will depend on the combustion temperature of the fuel gas used, but will typically be in the range of 3000–5000.degree. F. Preferably, a slight excess thickness of the rub coating 78 is applied, and then the excess is removed to shape the flow-path surface 26 and achieve the desired dimensional thickness of the rub coating 78. During the machining, any features that have been obscured by the steps 52, 54, and 60, such as holes or corners, are restored.

As in the case of the base-metal restoration 72, it is difficult to deposit the rub coating 78 to precisely the desired thickness, shape, and surface finish. In one approach, the surface of the rub coating is optionally machined, step 64, to the desired shape and thickness, as well as to the desired surface finish.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

What is claimed is:

1. A method for repairing a stationary shroud of a gas turbine engine, comprising the steps of
   furnishing the stationary shroud that has previously been in service, wherein the stationary shroud is made of a base metal;
   removing any damaged material from a flow-path region of the stationary shroud to leave an initially exposed base-metal flow-path surface; and
   applying a base-metal restoration overlying the initially exposed flow-path surface, the step of applying including the steps of
      furnishing a source of a structural material that is compatible with the base metal, and
      depositing the source of the structural material overlying the initially exposed base-metal flow-path surface of the stationary shroud by plasma transferred arc welding to form a repaired base-metal flow-path surface.

2. The method of claim 1, wherein the step of furnishing the stationary shroud includes the step of
   furnishing a high pressure turbine stationary shroud.

3. The method of claim 1, wherein the step of furnishing the stationary shroud includes a step of
   furnishing the stationary shroud made of a nickel-base alloy.

4. The method of claim 1, wherein the step of furnishing the stationary shroud includes a step of
   furnishing the stationary shroud made of a cobalt-base alloy.

5. The method of claim 1, wherein the step of furnishing the source of the structural material includes the step of
   furnishing the source of the structural material having substantially the same composition as the base metal.

6. The method of claim 1, wherein the step of furnishing the source of the structural material includes the step of
   furnishing the source of the structural material having a different composition than the base metal.

7. The method of claim 1, where the step of furnishing the source of the structural material includes the step of
   furnishing the source of the structural material as a powder.

8. The method of claim 7, wherein the step of depositing includes a step of
   directing a plasma transferred arc welder beam toward the initially exposed flow-path surface, and simultaneously injecting the powder into the plasma transferred arc welder beam so that the powder is fused and deposited.

9. The method of claim 1, where the step of furnishing the source of the structural material includes the step of
   furnishing the source of the structural material as a wire, and thereafter
   melting the wire using a plasma transferred arc welder beam.

10. The method of claim 1, including an additional step, after the step of applying the base-metal restoration, of
    applying an environmentally resistant rub coating overlying the base-metal restoration.

11. The method of claim 1, including additional steps, after the step of applying the base-metal restoration, of
    applying an environmentally resistant rub coating overlying the base-metal restoration, and
    machining the rub coating.

12. A method for repairing a high-pressure stationary turbine shroud of a gas turbine engine, comprising the steps of furnishing the high-pressure stationary turbine shroud that has previously been in service, wherein the high-pressure stationary turbine shroud is made of a base metal; thereafter removing any damaged material from a flow-path region of the high-pressure stationary turbine shroud to leave an initially exposed base-metal flow-path surface; thereafter applying a base-metal restoration overlying the initially exposed flow-path surface, the step of applying including the steps of furnishing a source of substantially the same material as the base metal, and depositing the source overlying the initially exposed base-metal flow-path surface of the high-pressure stationary turbine shroud by plasma transferred arc welding to form a repaired base-metal flow-path surface; and thereafter applying an environmentally resistant rub coating overlying the base-metal restoration.

13. The method of claim 12, where the step of furnishing the source of the structural material includes the step of furnishing the source of the structural material as a powder.

14. The method of claim 13, wherein the step of depositing includes a step of directing a plasma transferred arc welder beam toward the initially exposed flow-path surface, and simultaneously injecting the powder into the plasma transferred arc welder beam so that the powder is fused and deposited.

15. The method of claim 12, where the step of furnishing the source of the structural material includes the step of furnishing the source of the structural material as a wire, and thereafter melting the wire using a plasma transferred arc welder beam.

16. The method of claim 12, wherein the step of applying the base-metal restoration includes an additional step, after the step of depositing the source of the structural material, of machining the base-metal restoration.

17. The method of claim 12, including an additional step, after the step of applying the environmentally resistant rub coating, of machining the environmentally resistant rub coating.

18. A method for repairing a high-pressure stationary turbine shroud of a gas turbine engine, comprising the steps of furnishing the high-pressure stationary turbine shroud that has previously been in service, wherein the high-pressure stationary turbine shroud is made of a base metal; thereafter removing any damaged material from a flow-path region of the high-pressure stationary turbine shroud to leave an initially exposed base-metal flow-path surface; and thereafter applying a base-metal restoration overlying the initially exposed flow-path surface, the step of applying including the steps of furnishing a source of substantially the same material as the base metal, and depositing the source overlying the initially exposed base-metal flow-path surface of the high-pressure stationary turbine shroud by plasma transferred arc welding to form a repaired base-metal flow-path surface.

19. The method of claim 18, including an additional step, after the step of applying the base-metal restoration, of applying an environmentally resistant rub coating overlying the base-metal restoration.

* * * * *

UNITED STATES PATENT AND TRADEMARK OFFICE
CERTIFICATE OF CORRECTION

PATENT NO.    : 6,914,210 B2
DATED         : July 5, 2005
INVENTOR(S)   : Grossklaus, Jr. et al.

It is certified that error appears in the above-identified patent and that said Letters Patent is hereby corrected as shown below:

Column 1,
Line 12, delete "(et)" and insert -- (jet) --.

Signed and Sealed this

Seventh Day of February, 2006

JON W. DUDAS
*Director of the United States Patent and Trademark Office*